(No Model.)
J. BERGERON.
CULTIVATOR PLOW.
No. 372,396. Patented Nov. 1, 1887.
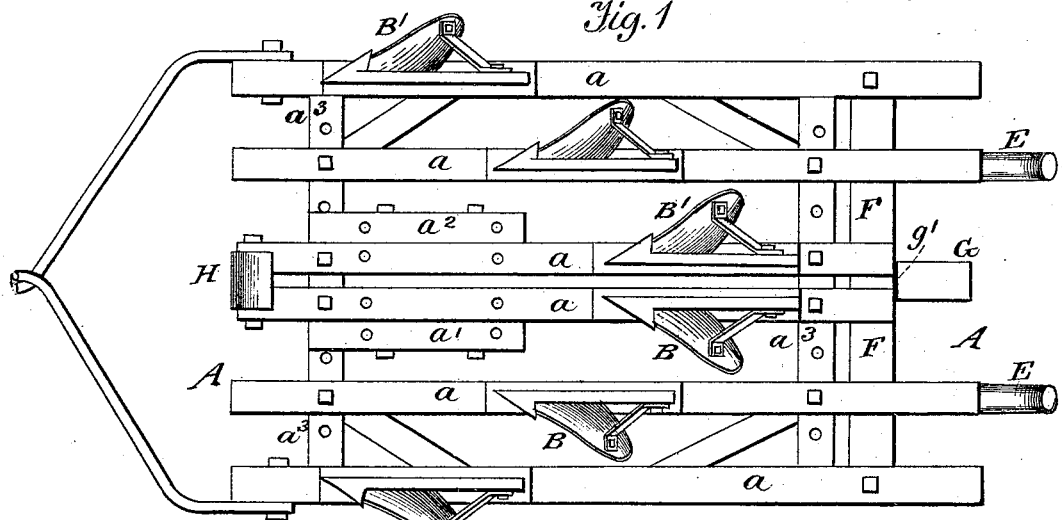
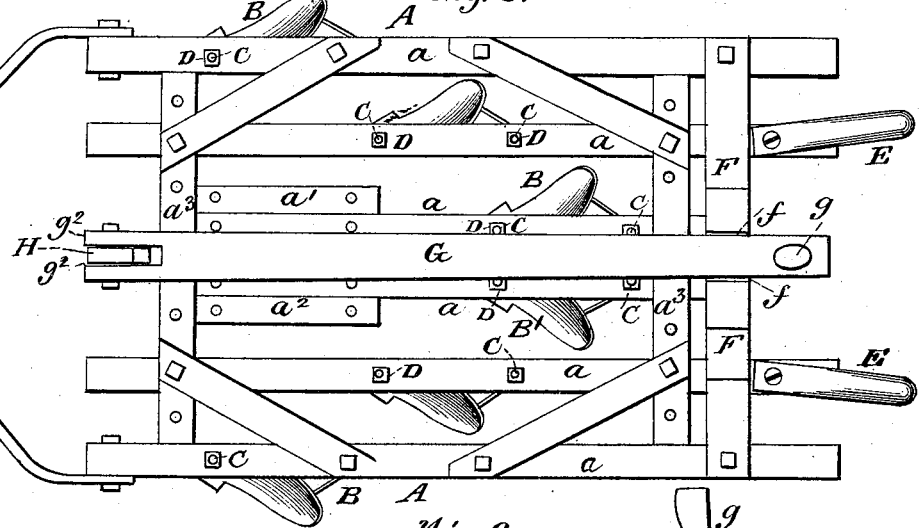
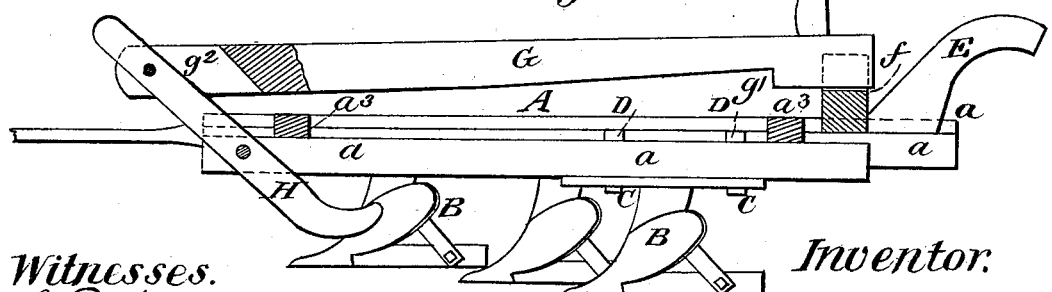
Witnesses.
A. Ruppert
W. T. Burris
Inventor.
Jules Bergeron
Per
Thomas P. Simpson
Atty

UNITED STATES PATENT OFFICE.

JULES BERGERON, OF BERWICK, LOUISIANA.

CULTIVATOR-PLOW.

SPECIFICATION forming part of Letters Patent No. 372,396, dated November 1, 1887.

Application filed April 13, 1887. Serial No. 234,657. (No model.)

*To all whom it may concern:*

Be it known that I, JULES BERGERON, a citizen of the United States, residing at Berwick, in the parish of St. Mary's and State of Louisiana, have invented certain new and useful Improvements in Cultivator-Plows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to form a V-shaped gang of plows which will run between two rows of corn and plow the whole space at one operation, the soil being thrown either to or from the two rows of plants.

Figure 1 of the drawings is a bottom view; Fig. 2, a top view, and Fig. 3 a longitudinal median vertical section.

In the drawings, A represents the frame, consisting of the longitudinal bars $a$, the short bars $a'$ $a^2$, and the cross-bars $a^3$ $a^3$.

In order to accomplish my object, I have two sets of plows, B B', one set on each side of the longitudinal axis or median line passing through the frame. As shown on Fig. 1 of the drawings, the two sets are arranged so as to throw the soil from the middle of the space between the rows of plants up toward the latter. When it is desired to reverse this operation, or "bar" the soil from the plants, the outer plow of set B is attached to the short bar $a^2$ and that of set B' on the short bar $a'$, said bars being provided with holes to receive the screws C, which are fastened on top by the nuts D. The middle plows of the two sets will simply exchange places, while the rear plow of each set will be simply carried across the middle and fastened on the outer bars, $a$, parallel to their former position.

On the rear ends of two of the bars $a$ $a$ are made fast the handles E E, while across the rear of frame I secure the cross-beam F, which is provided with a median notch, $f$, and in this notch fits a longitudinal bar, G, provided with the vertical handle $g$, subjacent shoulder $g'$, and front bifurcations, $g^2$ $g^2$. Between these bifurcations is pivoted one end of a vertically-movable lever, H, fulcrumed between the ends of the two middle bars, $a$ $a$. This lever is backwardly curved, sled-fashion, at the lower end, so that when the bar G is locked in the notch $f$ by the shoulder $g'$ the lever H will stand perpendicular and hold the plows off the ground, while the plowman will lift the handles. In this way all obstacles may be passed over without catching on the plows, while the bottom of lever serves as a sled or runner to take the friction on the ground. As soon as the plowman is ready, he lifts the bar G up and pushes it forward, and this has the effect of throwing the lower end of the lever H up under the frame, above the bottom of the plows and out of the way.

Having thus described all that is necessary to the understanding of my invention, what I claim as new, and desire to protect by Letters Patent, is—

A double-echelon cultivator-plow having the long bars $a$ and the short bars $a'$ $a^2$, constructed and arranged to receive the turn-plows, as shown and described, whereby said plows may be reversed in the manner set forth.

In testimony whereof I affix my signature in presence of two witnesses.

JULES BERGERON.

Witnesses:
J. D. COLLINS,
JNO. BRIGGARD.